United States Patent
Isberg et al.

(10) Patent No.: US 6,246,891 B1
(45) Date of Patent: *Jun. 12, 2001

(54) ACTIVE PREVENTION OF RADIO FREQUENCY EMISSIONS FROM A MOBILE COMMUNICATIONS UNIT IN RESTRICTED AREAS

(75) Inventors: B. Johanna Isberg, Lund; Mikael Dahlkvist, Södra Sandby; L. Fredrik Liljegren, Malmö ; Ulf C. Björkengren; Anders Khullar, both of Bjärred, all of (SE)

(73) Assignee: Telefonaktiebolaget LM Ericsson, Stockholm (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/972,948

(22) Filed: Nov. 19, 1997

(30) Foreign Application Priority Data

Dec. 20, 1996 (SE) .................................................. 9604739

(51) Int. Cl.[7] .................................................. H04B 1/40
(52) U.S. Cl. .............................. 455/574; 455/90; 455/97; 455/575

(58) Field of Search ..................................... 455/574, 575, 455/90, 97, 343, 129, 572, 63, 517

(56) References Cited

U.S. PATENT DOCUMENTS

| | | | |
|---|---|---|---|
| 4,449,248 | * | 5/1984 | Leslie et al. ........................... 455/38 |
| 5,224,150 | * | 6/1993 | Neustein ................................ 379/57 |
| 5,442,805 | * | 8/1995 | Sagers et al. ....................... 455/33.1 |
| 5,519,506 | * | 5/1996 | D'Avello et al. .................... 455/574 |
| 5,541,609 | | 7/1996 | Stutzman et al. . |
| 5,590,396 | * | 12/1996 | Henry ................................... 455/574 |
| 5,594,951 | * | 1/1997 | Bellin .................................. 455/574 |
| 5,659,889 | * | 8/1997 | Cockson ................................. 455/97 |
| 5,737,706 | * | 4/1998 | Seaholtz et al. ..................... 455/466 |
| 5,878,336 | * | 3/1999 | Cashen et al. ....................... 455/574 |

FOREIGN PATENT DOCUMENTS 2 282 705  4/1995  (GB) .

* cited by examiner

Primary Examiner—Daniel Hunter
Assistant Examiner—Thuan T. Nguyen
(74) Attorney, Agent, or Firm—Nixon & Vanderhye P.C.

(57) ABSTRACT

To enable use of an intelligent mobile communication unit (1) in areas where there are restrictions on the emission of radio frequency energy, the unit is provided with means (3) for actively preventing radio frequency radiation from the unit (1) even if non-radio frequency energy emitting parts of the unit (1) are operable.

15 Claims, 1 Drawing Sheet

ACTIVE PREVENTION OF RADIO FREQUENCY EMISSIONS FROM A MOBILE COMMUNICATIONS UNIT IN RESTRICTED AREAS

TECHNICAL FIELD

The invention relates to mobile communication units as well as to radio transmitters for communicating with such mobile communication units.

BACKGROUND OF THE INVENTION

The radio parts of mobile communication units, e.g. mobile phones or more advanced, intelligent mobile phones also having a computer part of some kind, may interfere in a hazardous way with electronic equipment in e.g. airplanes, airport terminal buildings, hospitals and other buildings having a demand on high margins against radio frequency interference.

Today, it is up to the individual users of such mobile communication units to switch off the units upon entering such restricted areas.

By switching off the units, also the computer part, if any, will of course be switched off. However, it may be desirable to use the computer part of such units in such restricted areas without running the risk of disturbing sensitive electronic equipment even if the radio parts have been switched off.

BRIEF DESCRIPTION OF THE INVENTION

One object of the invention is to bring about a mobile communication unit in which e.g. the computer part, if any, can be used also in areas having restrictions on radio frequency emission.

This is attained by means of the mobile communication units according to the invention by providing them with means for actively preventing the radio frequency emitting parts of the unit from causing disturbances at the same time as non-radio frequency emitting parts of the unit may be used by a user.

Another object is, on the one hand, to bring about mobile communication units in which at least the radio part is automatically switched off upon entering an area with restrictions on radio frequency emission, and, on the other hand, to bring about a radio transmitter cooperating with such mobile communication units to switch them off upon entering such restricted areas.

This is attained in accordance with the invention by providing the mobile communication units with a detector for detecting a power shut-down signal emitted by a radio transmitter located in or near an area having restrictions on radio frequency emission. The power shut-down signal is emitted in order to turn off the power to at least the radio parts of mobile communication units entering the restricted area.

Hereby, it will be possible for a user to use other parts such as the computer part of such mobile communication units also in restricted areas without the risk of disturbing sensitive electronic equipment in such areas.

BRIEF DESCRIPTION OF THE DRAWING

The invention will be described more in detail below with referenced to the appended drawing, on which FIG. 1 schematically illustrates a first example embodiment of a mobile communication unit according to the invention.

PREFERRED EMBODIMENTS

Figure 1:
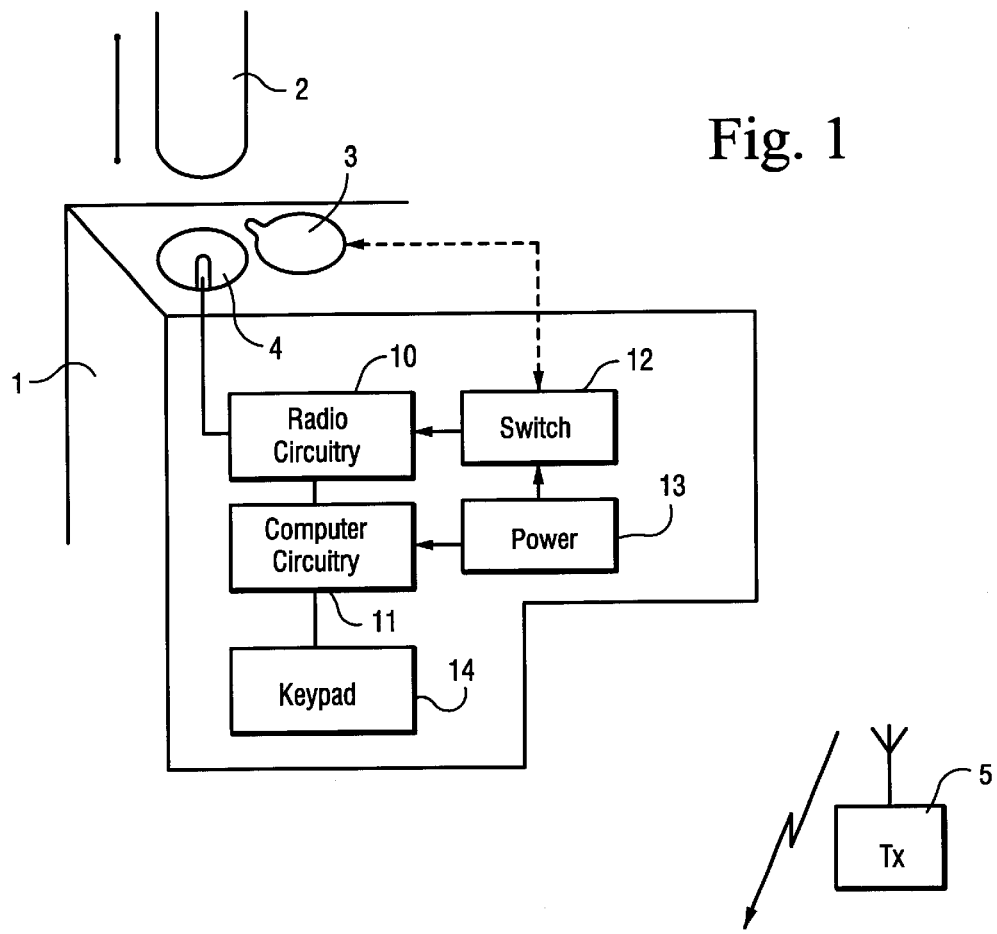

FIG. 1 schematically illustrates a first example embodiment of the invention for actively preventing radio frequency radiation from a mobile communication unit, generally denoted 1. Besides radio circuitry, the unit 1 may comprise intelligent parts such as a computer circuitry 11 coupled to the radio part 10 and to a keyboard 14.

In accordance with this example embodiment of the invention, the mobile communication unit 1 is provided with a removable antenna 2 removably coupled to the radio part 10. Upon removal of the antenna 2 from the mobile communication unit 1, a spring loaded, electrically grounded lid 3 is automatically moved into position to cover an opening 4 left in top of the frame of the mobile communication unit 1 upon removal of the antenna 2.

The lid 3, together with shielding (not shown) in the frame of the mobile communication unit 1, is adapted to effectively shield all radio frequency emitting parts in the mobile communication unit 1. Thus, it will be possible to use other parts such as the computer circuitry 11, if any, of the mobile communication unit 1 without running the risk of emitting disturbing radio frequency energy.

According to an example of the invention, a switch 12 can be provided in the mobile communication unit 1 to disconnect the power 13 to at least the radio frequency emitting parts in the mobile communication unit 1 upon removal of the antenna 2. Of course, that switch may be adapted to switch off the power in the whole unit 1.

Also according to an example of the invention, this switch can be combined with the lid 3 to further ensure that no disturbing radio frequency energy is emitted by the radio frequency emitting parts in the mobile communication unit 1 upon removal of the antenna 2.

Figure 2:
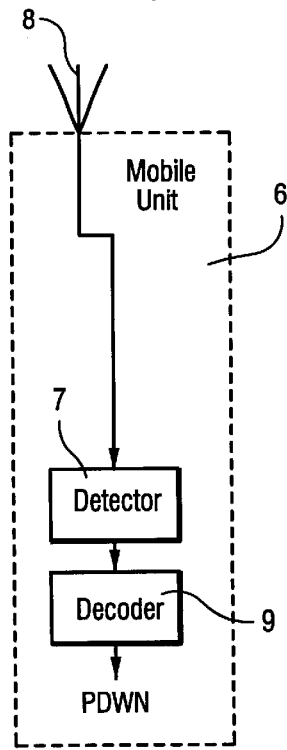
FIG. 2 is a schematical block diagram of a second example embodiment of a mobile communication unit according to the invention, cooperating with a radio transmitter according to the invention.

FIG. 2 illustrates a second example embodiment of the invention.

The example embodiment shown in FIG. 2 comprises a radio transmitter 5 and a mobile communication unit 6. The radio transmitter 5 may be a normal base station. It may also be a separate radio transmitter specifically located in or near an area where mobile communication units, such as the unit 6 in FIG. 2, must not radiate radio frequency energy.

In accordance with this example embodiment of the invention, the radio transmitter 5 is adapted to transmit a predetermined power shut-down signal for automatically switching off at least the radio frequency emitting part of any mobile communication unit, such as unit 6, present within that area. This power shut-down signal may be generated constantly by the radio transmitter 5. As an alternative, it may instead be generated when the radio transmitter 5 detects that a mobile communication unit approaches or enters a restricted area.

To facilitate the switching off of at least the radio frequency emitting part of the mobile communication unit 6 approaching or entering the restricted area, the mobile communication unit 6 according to the invention comprises a detector 7. The detector 7 is connected to the antenna 8 of the mobile communication unit 6 and is adapted to detect the power shut-down signal transmitted by the radio transmitter 5.

Upon detection of the power shut-down signal, the detector 7 is adapted to generate a power-down signal. This signal is supplied to the power source (not shown) of the mobile communication unit 6. Upon reception of the power-down signal, the power source disconnects the power to at least all the radio frequency emitting parts (not shown) of the mobile communication unit 6. Of course, the power can be switched off in the whole unit 6.

In order to protect the mobile communication unit 6 from being deactivated unintentionally, the power shut-down signal transmitted by the radio transmitter 5 may according to the invention include a coded message. In such cases, the mobile communication unit 6 comprises a decoder 9 which in the example embodiment shown is connected to the output terminal of the detector 7. This decoder 9 is adapted to decode the coded message transmitted by the radio transmitter 5. A power down signal PDWN will only be supplied to the power source of the unit 6 if a valid power shut-down message is received and decoded.

When the power shut-down signal transmitted by the radio transmitter 5 is no longer detected by the detector 7 in the mobile communication unit 6, e.g. due to the fact that the mobile communication unit 6 has been moved out of or away from the restricted area, the power will be switched on again in the mobile communication unit 6. Its radio frequency emitting part (not shown) will return to its active state and the mobile communication unit 6 will be ready for normal operation.

In accordance with this example embodiment of the invention, at least the radio frequency emitting parts of the mobile communication unit 6 are deactivated by the reception of the power shut-down signal from the radio transmitter 5. Thus, the user of the mobile communication unit 6 will be able to use other parts such as e.g. a computer part, if any, of the mobile communication unit 6.

As indicated above, the power shut-down signal transmitted by the radio transmitter 5 and detected by the detector 7 may cause the power to be switched off in the whole mobile communication unit 6 and not just to the radio frequency emitting parts. A user wishing to use the non-radio frequency emitting parts of the unit 6 within the restricted area would, thus, have to turn on the unit 6. However, in that case, only the non-radio frequency emitting parts of the unit 6 would be turned on while the radio frequency emitting parts would remain turned off. Also, upon leaving the restricted area, the user would have to turn on the unit 6 again.

In a third example embodiment of the invention, the mobile communication unit is provided with a controller, e.g., included in the computer part 11 adapted to recognize a predetermined code keyed by the user on the keypad 14 of the unit. In response to the detection of the code, the controller is adapted to switch off the power to at least the radio frequency emitting part of the unit. If provided, e.g., the computer part 11 with e.g. a computer part, the mobile communication unit will, then, operate in an off-net mode in which it will still be possible to use the computer part. Also, in this embodiment, the power may be switched off in the whole unit. While the present invention has been described with respect to a particular embodiment, those skilled in the art will recognize that the present invention is not limited to the specific example embodiments described and illustrated herein. Different formats, embodiments, and adaptations besides those shown and described as well as many modifications, variations, and equivalent arrangements may also be used to implement the invention. Accordingly, it is intended that the invention be limited only by the scope of the claims appended hereto.

Thus, as should be apparent from the above, by means of the mobile communication unit according to the invention, the risk of unintentionally disturbing radio frequency sensitive electronic equipment, is considerably reduced.

What is claimed is:

1. A mobile communications unit, comprising:
    a housing enclosing at least partially a power source and radio circuitry;
    an antenna removably attached to the housing and electrically coupled to the radio circuitry; and
    a switch operably coupled to detect removal of the antenna from the housing to remove power from the power source to the radio circuitry.

2. The mobile communications unit in claim 1, further comprising:
    circuitry other than the radio circuitry to which power from the power source is maintained when power is removed from the radio circuitry.

3. The mobile communications unit in claim 1, further comprising:
    circuitry other than the radio circuitry to which power from the power source is removed when power is removed from the radio circuitry.

4. The mobile communications unit in claim 1, wherein power is removed from the radio circuitry to prevent emission of undesired radio frequency radiation from the mobile communications unit.

5. The mobile communications unit in claim 1, further comprising:
    an input device manually actuable by an operator causing the switch to remove power from the radio circuitry.

6. The mobile communications unit in claim 1, wherein the antenna is attached to the housing by way of an opening in the housing, the mobile communications unit further comprising:
    movable lid movable to cover the opening in the housing when the antenna is removed to ensure that radio frequency energy is not emitted by the mobile communication unit through the opening when the antenna is removed.

7. The mobile communications unit in claim 6, wherein the movable lid is made of a radio frequency shielding material and is automatically moved to cover the opening in the housing when the antenna is removed from the housing.

8. The mobile communications unit in claim 6, wherein the switch is activated by movement of the movable lid.

9. A mobile communications unit, comprising:
    a power source;
    radio circuitry coupled to receive power from the power source;
    a detector detecting that the mobile communications unit is in an area where radio emissions are restricted and causing power to be removed from the power source to the radio circuitry; and
    circuitry other than the radio circuitry to which power from the power source is maintained when power is removed from the radio circuitry, wherein said circuitry other than the radio circuitry is used for computer based applications.

10. The mobile communications unit in claim 7, further comprising:
    circuitry other than the radio circuitry to which power from the power source is removed when power is removed from the radio circuitry.

11. The mobile communications unit in claim 9, wherein power is removed from the radio circuitry to prevent emission of undesired radio frequency radiation from the mobile communications unit.

12. The mobile communications unit in claim 9, further comprising:

an input device manually actuable by an operator to cause power to be removed from the radio circuitry.

13. The mobile communications unit in claim 7, wherein the detector detects a coded radio emission restriction signal from a remote radio transmitter, the mobile communications unit further comprising:

a decoder coupled to the detector decoding the coded radio emission restriction signal from a remote radio transmitter to determine whether the radio restriction signal is valid before power is caused to be removed from the power source to the radio circuitry.

14. A method for preventing unauthorized radio emissions from a mobile communications unit in a restricted area based on an unauthorized radio transmissions area message from a radio base station, comprising:

receiving a radio transmission at the mobile communications unit from the radio base station;

detecting in the received radio transmission the unauthorized radio transmissions area message;

removing power to radio circuitry of the mobile communications unit in response to the detected unauthorized radio transmissions area message; and maintaining power to circuitry other than the radio emission circuitry of the mobile communications unit in response to the detected unauthorized radio transmissions area message, wherein said circuitry other than the radio emission circuitry is used for computer based applications.

15. The method in claim 14, further comprising:

decoding the unauthorized radio transmissions area message to determine whether the unauthorized radio transmissions area message is valid.

* * * * *

UNITED STATES PATENT AND TRADEMARK OFFICE
CERTIFICATE OF CORRECTION

PATENT NO. : 6,246,891 B1
DATED : June 12, 2001
INVENTOR(S) : Isberg et al.

It is certified that error appears in the above-identified patent and that said Letters Patent is hereby corrected as shown below:

Column 4,
Line 61, change "7" to -- 9 --.

Column 5,
Line 7, change "7" to -- 9 --.

Signed and Sealed this

Fourth Day of January, 2005

JON W. DUDAS
*Director of the United States Patent and Trademark Office*